United States Patent
Hopkins et al.

(10) Patent No.: US 12,124,829 B2
(45) Date of Patent: Oct. 22, 2024

(54) SYSTEMS AND METHODS FOR NOTIFICATION AND DEPLOYMENT OF AN INSTALLATION AT A PLURALITY OF DEVICE LOCATIONS

(71) Applicant: Walmart Apollo, LLC, Bentonville, AR (US)

(72) Inventors: James Aaron Hopkins, Bella Vista, AR (US); Nathan Cole Hyatt, Fayetteville, AR (US); Nicholas Paul Offutt, Bentonville, AR (US); Jeffrey Darrell Parker, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 282 days.

(21) Appl. No.: 17/474,468

(22) Filed: Sep. 14, 2021

(65) Prior Publication Data
US 2023/0084133 A1 Mar. 16, 2023

(51) Int. Cl.
*G06F 9/44* (2018.01)
*G06F 8/61* (2018.01)
(Continued)

(52) U.S. Cl.
CPC ............... *G06F 8/61* (2013.01); *H04L 67/34* (2013.01)

(58) Field of Classification Search
CPC ........................................................ G06F 8/61
See application file for complete search history.

(56) References Cited

U.S. PATENT DOCUMENTS 6,714,969 B1  3/2004  Klein et al.
8,074,213 B1 * 12/2011 Holtz .................. G06F 8/65
                                                          717/172
(Continued)

FOREIGN PATENT DOCUMENTS

CA      2695383 A1    5/2009
JP      2013-137597 A  7/2013
JP      2017-167857 A  9/2017

OTHER PUBLICATIONS

Japanese Intellectual Property Office, Office Action issued in related Japanese Application No. 2012-170262, Jan. 17, 2023, 8 pages.
(Continued)

*Primary Examiner* — S. Sough
*Assistant Examiner* — Mohammad H Kabir
(74) *Attorney, Agent, or Firm* — Morgan, Lewis & Bockius LLP; Manita Rawat (57) ABSTRACT

A deployment system can include a computing device that is configured to receive a broadcast message from a deployment device in response to the deployment device receiving an approval notification and obtain a plurality of deployment parameters via a distributed communications system. The computing device can also be configured to identify an installation time included in the plurality of deployment parameters and download application data associated with an application identifier included in the plurality of deployment parameters to a local database. The computing device can also be configured to initiate an installation of the application data from the local database at the installation time and transmit a status update to the deployment device in response to the installation being initiated.

20 Claims, 6 Drawing Sheets

(51) Int. Cl.
*G06F 21/51* (2013.01)
*H04L 29/08* (2006.01)
*H04L 67/00* (2022.01)

(56) References Cited

U.S. PATENT DOCUMENTS

| | | | | |
|---|---|---|---|---|
| 8,484,637 | B2 * | 7/2013 | Farhangi | G06F 8/62 |
| | | | | 717/121 |
| 8,869,142 | B2 * | 10/2014 | Gouge | H04L 67/34 |
| | | | | 717/169 |
| 10,915,311 | B2 * | 2/2021 | Zalpuri | G06F 8/65 |
| 11,082,294 | B2 * | 8/2021 | Magley | H04L 12/189 |
| 11,405,449 | B1 * | 8/2022 | Saraya | H04L 63/10 |
| 2006/0010437 | A1 * | 1/2006 | Marolia | G06F 8/65 |
| | | | | 717/168 |
| 2007/0043831 | A1 * | 2/2007 | Kessler | H04L 67/62 |
| | | | | 709/219 |
| 2010/0306356 | A1 * | 12/2010 | Gao | G06F 8/60 |
| | | | | 709/222 |
| 2013/0145358 | A1 * | 6/2013 | Tsongas | G06F 8/65 |
| | | | | 717/173 |
| 2014/0289761 | A1 * | 9/2014 | Weinberger | H04N 21/41407 |
| | | | | 725/32 |
| 2018/0321993 | A1 | 11/2018 | McClory et al. | |
| 2018/0359778 | A1 * | 12/2018 | Splitz | H04L 67/62 |
| 2020/0192690 | A1 * | 6/2020 | Gupta | H04L 67/34 |
| 2021/0149769 | A1 | 5/2021 | Balcha et al. | |

OTHER PUBLICATIONS

Canadian Intellectual Property Office, Office Action issued in related Canadian Application No. 3,134,639, Jan. 20, 2023, 5 pages.
Canadian Intellectual Property Office, Office Action issued in related Canadian Application No. 3,134,639, Oct. 3, 2023, 4 pages.
Canadian Intellectual Property Office, Office Action issued in Canadian Application No. 3,134,639, Aug. 7, 2024, 4 pages.

* cited by examiner

SYSTEMS AND METHODS FOR NOTIFICATION AND DEPLOYMENT OF AN INSTALLATION AT A PLURALITY OF DEVICE LOCATIONS

TECHNICAL FIELD

The disclosure relates generally to systems and methods for notifying and deploying an installation at various device locations and more specifically downloading installation data at a local database for future local installation.

BACKGROUND

In a system with multiple locations across various time zones, including multiple devices at each location, deploying an installation or update to the multiple locations presents a variety of challenges. For example, scheduling the installation or update to avoid overwhelming the system and devices at particular locations is important as well as difficult due to the varying timing needs of the multiple locations. Further, ensuring successful installations also presents challenges due to local network-constrained environments or offline scenarios, preventing the installation from occurring.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a deployment system and related methods. The deployment system can include a computing device that is configured to receive a broadcast message from a deployment device in response to the deployment device receiving an approval notification and obtain a plurality of deployment parameters via a distributed communications system. The computing device can also be configured to identify an installation time included in the plurality of deployment parameters and download application data associated with an application identifier included in the plurality of deployment parameters to a local database. The computing device can also be configured to initiate an installation of the application data from the local database at the installation time and transmit a status update to the deployment device in response to the installation being initiated.

In another aspect, the computing device is configured to, determine a present time, download the application data to the local database in response to a difference between the installation time and the present time being greater than a threshold period and store the downloaded application data and the plurality of deployment parameters in a queue.

In another aspect, the computing device is configured to, in response to the installation time of at least one set of deployment parameters being the present time, dequeue the downloaded application data and initiate installation of the downloaded application data from the local database.

In another aspect, the computing device is configured to, when the difference is less than the threshold period, delay downloading the application data associated with the application identifier included in the plurality of deployment parameters to the local database until the installation time.

In another aspect, the approval notification indicates (i) a plurality of computing devices to transmit the broadcast message, (ii) the application identifier, and (iii) a corresponding installation time for each of the plurality of computing devices.

In another aspect, initiating installation of application data from the local database includes installing the application data on at least one local device.

In another aspect, the at least one local device is indicated in the plurality of deployment parameters.

In another aspect, the computing device is configured to, in response to receiving a notification indicating successful installation from the at least one local device, transmit a status update to the deployment device indicating successful installation on the at least one local device.

In another aspect, the computing device is configured to, in response to a threshold number of unsuccessful installation attempts on the at least one local device being received, generate and transmit an alert to the deployment device indicating unsuccessful installation.

In various embodiments of the present disclosure, a method of deployment is provided. In some embodiments, the method can include receiving a broadcast message from a deployment device in response to the deployment device receiving an approval notification and obtaining a plurality of deployment parameters via a distributed communications system. The method can also include identifying an installation time included in the plurality of deployment parameters and downloading application data associated with an application identifier included in the plurality of deployment parameters to a local database. The method can also include initiating an installation of the application data from the local database at the installation time and transmitting a status update to the deployment device in response to the installation being initiated.

In various embodiments of the present disclosure, a non-transitory computer readable medium is provided. The non-transitory computer readable medium can have instructions stored thereon, wherein the instructions, when executed by at least one processor, cause a device to perform operations that include receiving a broadcast message from a deployment device in response to the deployment device receiving an approval notification and obtaining a plurality of deployment parameters via a distributed communications system. The operations can also include identifying an installation time included in the plurality of deployment parameters and downloading application data associated with an application identifier included in the plurality of deployment parameters to a local database. The operations can also include initiating an installation of the application data from the local database at the installation time and transmitting a status update to the deployment device in response to the installation being initiated.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

In the drawings, reference numbers may be reused to identify similar and/or identical elements.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

A deployment system may be implemented to transmit a message to a plurality of clusters, for example, individual store devices at individual locations that are associated with an entity. In various implementations, the entity may be a retail corporation and the individual locations include stores associated with the retail corporation. Each individual location includes a plurality of devices, such as point of sale devices, general computers, handheld devices, etc. used during normal operation of the store. The message transmitted to the plurality of store devices includes unique deployment parameters for each store, indicating an application for installation, an installation time, etc. The deployment system manages the scheduling and execution of installations for the plurality of devices within the individual locations by sending the message. The installations may be installing new applications, updating versions of existing applications, etc.

In each deployment, each store that is indicated in the deployment may download the application on a local database or server and actually initiate installation of the application at the scheduled installation time, separate from installations occurring at other stores of the same application in the same deployment. While, based on local installation speeds, installation may take minutes or days, the installation at each individual store is only impacted by that store's day to day operations and local network constraints and avoids being impacted by across network outages or other constraints related to connecting to the deployment device or application database connectivity by storing and implementing the installation locally. In various implementations, the installation times at the plurality of stores may be the same (e.g., upon receipt), and, in this scenario, the application may be simultaneously downloaded and installed locally at the plurality of stores.

The deployment device directly interacts with a messaging module at the local store devices to broadcast deployment information to the plurality of stores or clusters. Each of the stores is managed by the entity operating the deployment device and directing installations, including new software or applications as well as updates to existing software and applications. The deployment system includes a plurality of messaging modules and a plurality of implementation modules, which one of each may be located at each store, to receive broadcast messages from the deployment device via a distributed communications system. The broadcast message may include deployment parameters, such as application identification by name, version, etc.; an installation time for each store; identification of local devices to install application; etc. In various implementations, the broadcast message may include which stores to broadcast the message to and a deployment identifier. Then, based on the deployment identifier, each local store can obtain deployment features from a deployment features database via the distributed communications system.

The deployment device also includes a status database that receives status information from each implementation device located at the plurality of stores, indicating the start and completion of each installation, as well as any installation failures that should be separately addressed. Once the indicated messaging modules are notified of the installation, the implementation modules of the individual stores can download the applications for installation, to store locally and install at the indicated day and time. Therefore, independent of whether the local system is online at the scheduled time of installation of the application or is in network-constrained environments, the local system can continue with the installation as the application and any corresponding data were stored locally in response to receiving the installation message.

Not only does the deployment system obviate potential offline issues, but the deployment system also anticipates and avoids overwhelming the local systems by scheduling the installation based on the local system, reducing impact on the local system. For example, the messaging module may receive in the broadcast message or obtain from the deployment features database a day and time for the installation to occur for each local system or cluster, such as 6:00 am UTC for a local system in New York and 12:00 pm UTC for a local system in Hawaii, to prevent interference with regular operations. The installation time is stored along with the downloaded application to initiate installation locally at the installation time, regardless of whether the local system at the store can connect to the deployment device or other remote databases. In various implementations, the deployment device may also transmit a cancel notice to one of more store devices implementing the installation. While the local store system may have downloaded the particular application for installation, if a cancel notice is attached to the installation time, once the installation is initiated, the cancel notice will prompt the implementation module to exit the installation.

Figure 1:
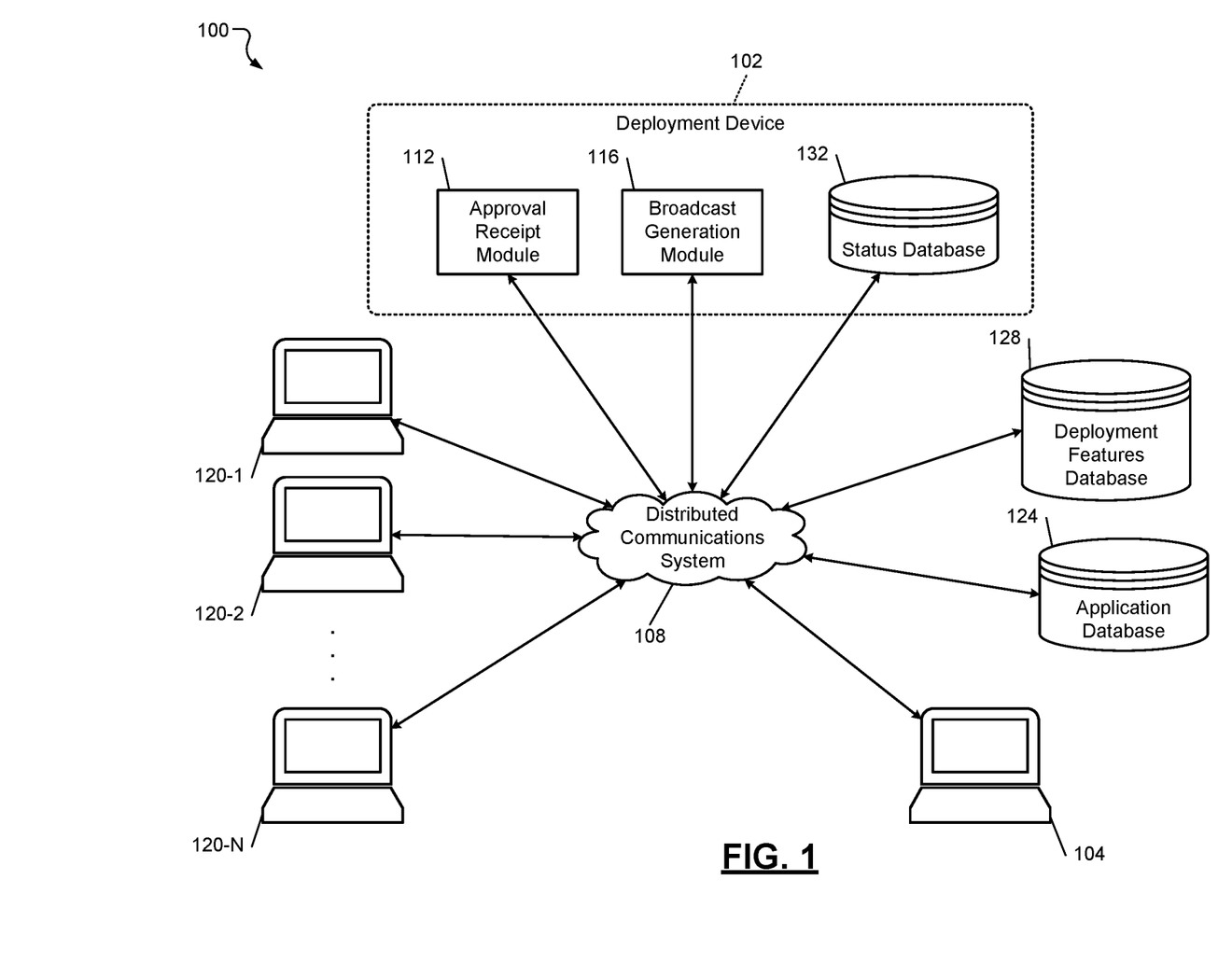
FIG. 1 is a block diagram of a deployment system in accordance with some embodiments.

Referring to FIG. 1, a block diagram of a deployment system 100 is shown. The deployment system 100 may include a deployment device 102 and an approval device 104, such as a phone, tablet, laptop, mobile computing device, desktop, etc., that interacts with the deployment device 102 via a distributed communications system 108. In various implementations, the deployment device 102 and the approval device 104 may be a single device. The approval device 104 transmits an approval notification to the deployment device 102 upon a designated operator approving a deployment or release of an installation. In various implementations, the approval device 104 displays deployment parameters associated with the deployment for the operator to approve. For example, another individual generates the deployment parameters, indicating which stores will receive the installation message, an application or application version indicator that will be installed, a day and time for each installation at each store, etc. The deployment parameters are then sent to the approval device 104 for the operator to approve. In various implementations, the deployment parameters may be generated using the approval device 104 or another computing device. However, the operator approving the deployment parameters or features is different from the individual generating the deployment parameters.

Upon approval, the approval device 104 transmits the approval to the deployment device 102. The deployment device 102 includes an approval receipt module 112 that receives the transmitted approval. The approval receipt module 112 confirms receipt of approval by a verified and approved operator. For example, the operator may log in to the approval device 104 (or another device and log in to a particular webpage or website operated by the entity) and the approval receipt module 112 verifies the log in credentials. The approval receipt module 112 forwards the verification and approval message to a broadcast generation module 116. The broadcast generation module 116 parses the approval message, identifying the application for installation, the stores to which the application will be installed, etc. The broadcast generation module 116 also generates a broadcast message to be transmitted to the stores indicated in the approval message. For example, the broadcast message may be transmitted to a first store device 120-1, a second store device 120-2, . . . , and an Nth store device 120-N, collectively, the store devices 120. Each of the store devices 120 may be a computing device, such as a mobile computing device, a laptop, desktop, etc. Each store that the broadcast message is transmitted to by the broadcast generation module 116 of the deployment device 102 may download the application for installation (as indicated in the broadcast message) from an application database 124. In various implementations, the broadcast generation module 116 may be implemented using Apache Kafka®. Alternatively, the approval device 104 may directly broadcast the approval message to the specific store devices 120 that are indicated in the deployment parameters as having the indicated application installed.

Further, in various implementations, the broadcast message may include minimal information, such as that an approval message was received for the store to which the broadcast message is being sent and a deployment identifier. When the broadcast message simply includes a deployment identifier, the approval receipt module 112 or the broadcast generation module 116 may transmit and store the corresponding deployment features for each of the store devices 120 in a deployment features database 128 for the corresponding store, such as the first store device 120-1, to obtain upon receiving the broadcast message. The deployment features for each of the store devices 120 may include installation times along with additional installation parameters (e.g., limiting which in-store devices to receive which application installations, etc.). Additionally, the deployment device 102 includes a status database 132 to receive installation status updates from each of the store devices 120 during installation to maintain a log of successful or unsuccessful installations.

The deployment device 102, the approval device 104, and the store devices 120 can each be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the deployment device 102, the approval device 104, and/or the store devices 120 can be a computer, a workstation, a laptop, a server such as a cloud-based server, or any other suitable device. In some examples, the deployment device 102, the approval device 104, and/or the store devices 120 can be a cellular phone, a smart phone, a tablet, a personal assistant device, a voice assistant device, a digital assistant, a laptop, a computer, or any other suitable device. In various implementations, the deployment device 102 is on a central computing system that is operated and/or controlled by a retailer. Additionally or alternatively, the modules and databases of the deployment device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

Figure 2:
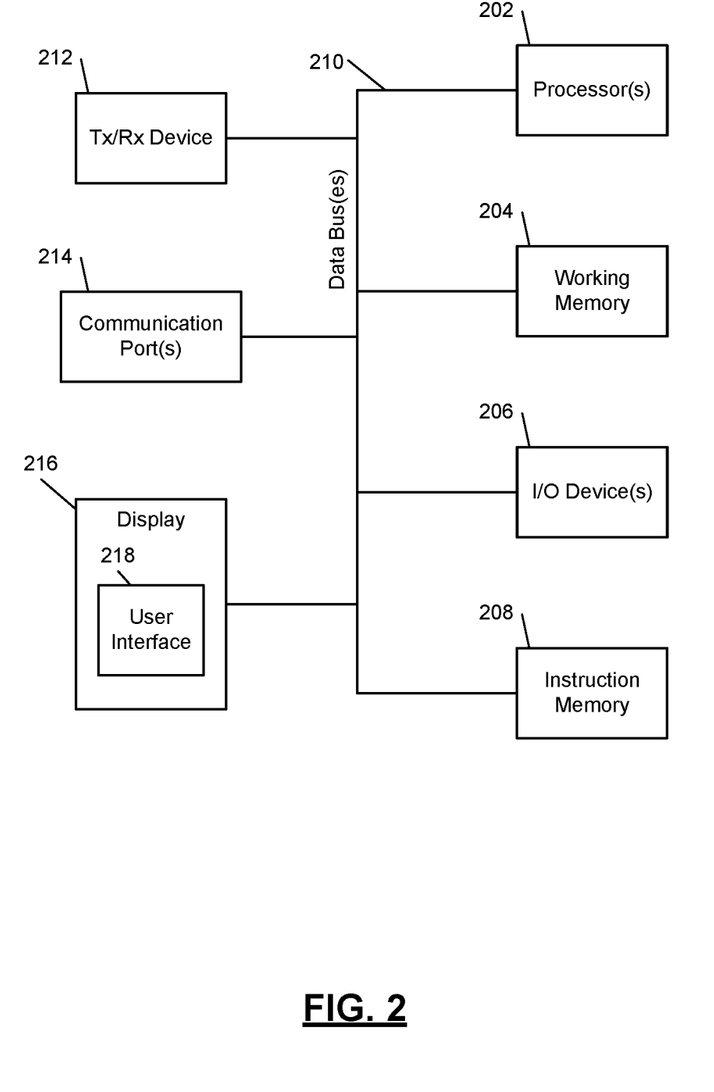
FIG. 2 is a block diagram of a computing device implementing the deployment device of FIG. 1 in accordance with some embodiments.

FIG. 2 illustrates an example computing device 200. The deployment device 102, the approval device 104, and/or the store devices 120 may include the features shown in FIG. 2. For the sake of brevity, FIG. 2 is described relative to the deployment device 102.

As shown, the deployment device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the deployment device 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as data items including feedback information.

Display 216 can display a user interface 218. User interfaces 218 can enable user interaction with the deployment device 102. For example, user interface 218 can be a user interface that allows an operator to interact, communicate, control and/or modify different features or parameters of the deployment device 102. The user interface 218 can, for example, display the deployment features for an operator or user to view prior to issuing an approval. In some examples, a user can interact with user interface 218 by engaging input-output devices 206, such as issuing the approval on the approval device 104. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the deployment device 102 will be operating. Processor(s) 202 is operable to receive data from, or send data to, a network, such as the distributed communications system 108 of FIG. 1, via transceiver 212.

Figure 3:
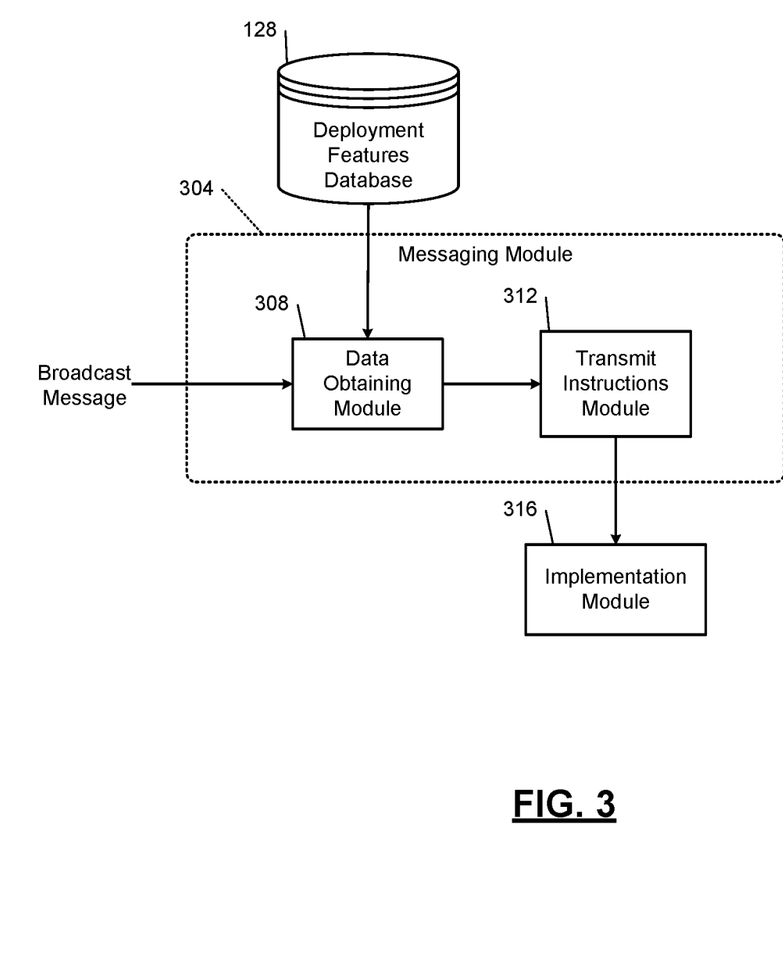
FIG. 3 is a block diagram illustrating an example of a messaging module of the deployment system of FIG. 1 in accordance with some embodiments.

Referring to FIG. 3, a block diagram illustrating an example of a messaging module 304 of the deployment system 100 of FIG. 1 is shown. The messaging module 304 may be located on each of the store devices 120. In various implementations, the messaging module 304 is an additional device located and associated with each of the store devices 120. The messaging module 304 receives the broadcast message when the corresponding store device, for example, the first store device 120-1, is indicated in the approval message as being included in the deployment of one or more applications.

A data obtaining module 308 of the messaging module 304 receives the broadcast message. In response to receiving the broadcast message, the data obtaining module 308 obtains deployment features of parameters from the deployment features database 128. For example, the deployment features include the installation time corresponding to the specific store, the application to be installed, devices at the specific store on which to install the application, etc. In various implementations, if there are multiple applications to install at one or more stores, there are multiple deployments and multiple approval messages for each application or application version. For example, if a certain set of devices at a set of stores are to have application 1 installed, a single deployment will be completed for that installation. Then, if another set of devices, even if at the same set of stores, is to have application 2 installed, a separate or second deployment will be completed, including a separate approval message, for that installation.

In various implementations, the deployment system 100 may have multiple deployments for the same application to a different set of stores, to ensure there are no issues with installation of the application. For example, a first deployment may indicate five stores, a second deployment may indicate 10 stores, etc. Then, if a deployment results in multiple unsuccessful installations, a subsequent deployment may be delayed or canceled for troubleshooting or updating of the application. The data obtaining module 308 forwards the obtained deployment features to a transmit instructions module 312. The transmit instructions module 312 transmits the deployment features corresponding to the particular store to an implementation module 316 at the corresponding store (e.g., the first store device 120-1). In various implementations, the deployment device 102 may directly transmit the deployment features to the indicated store devices 120.

Figure 4:
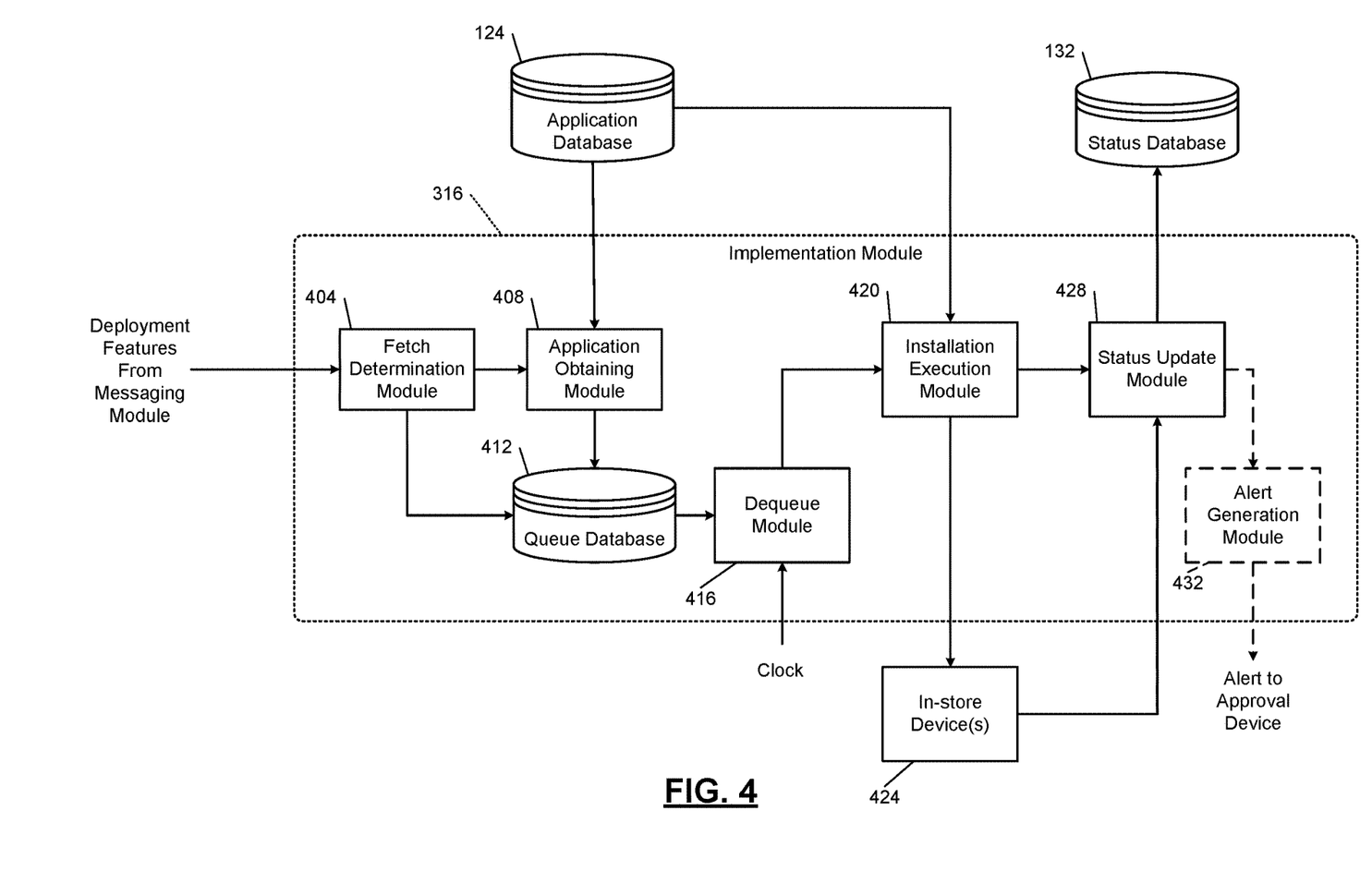
FIG. 4 is a block diagram illustrating an example an implementation module of the deployment system of FIG. 1 in accordance with some embodiments.

Referring now to FIG. 4, a block diagram illustrating the implementation module 316 of the deployment system 100 of FIG. 1 is shown. The implementation module 316 includes a fetch determination module 404 that receives the deployment features from the messaging module 304. The fetch determination module 404 determines whether the application indicated in the deployment features should be obtained or "pre-fetched" based on the installation time included in the deployment features. In various implementations, the implementation module 316 may only obtain and download the application indicated in the deployment features if the installation time is over a threshold time away from a present time. For example, if the installation time is less than 30 minutes from the present time, the implementation module 316 may instead download the application at the installation time and proceed with installation. The pre-fetch implementation operates to obviate any potential offline scenarios where a store that is set to have an application installed is prevented from installing the application because the store cannot access the application database 124 via a distributed communications system 108. Additionally or alternatively, the pre-fetch feature may also obviate any network constraints at the time of installation, such as slowed speeds due to connectivity of the store's network, the distributed communications system 108, or other connectivity limitations.

If the installation time is greater than the threshold time away from the present time, the fetch determination module 404 forwards a fetch indication for the corresponding application to an application obtaining module 408. The application obtaining module 408 retrieves the corresponding application indicated in the deployment features (e.g., by an application identifier) from the application database 124, which, in various implementations, may be indexed by application identifier. While the application database 124 and the status database 132 are shown as directly interacting with the implementation module 316 of the store devices 120, as shown in FIG. 1, the application database 124 and the status database 132 may be communicating with the store devices 120/the implementation module 316 via the distributed communications system 108. However, if the installation time is less than the threshold time away from the present time, the fetch determination module 404 may instead add the deployment features corresponding to the particular deployment to a queue database 412. The queue database 412 stores each set of deployment features according to the installation time. If no installation time is indicated, the fetch determination module 404 may add the set of deployment features to the queue database 412 with a present time.

A dequeue module 416 removes the set of deployment features based on a present time as determined by a clock indicator. The dequeue module 416 removes the set of deployment features with an installation time matching the present time. If multiple sets of deployment features have a same installation time, the dequeue module 416 removes the set of deployment features that was added to the queue database 412 first. The dequeue module 416 pulls the set of deployment features from the queue database 412 and forwards the set of deployment features to an installation execution module 420. In various implementations, the installation execution module 420 may be operated by Helm®. The installation execution module 420 initiates installation of the application (indicated in the deployment features) on indicated in-store devices 424. In various implementations, each of the store devices 120 may include a central computing device, individual devices (such as point-of-sale device, in-store computers, etc.), handheld devices, etc. via a distributed communications system (such as the distributed communications system 108).

The installation execution module 420 may receive from the dequeue module 416 the deployment features as well as the pre-fetched and downloaded application. However, if the deployment features do not include a corresponding downloaded application, the installation execution module 420 may obtain the corresponding application from the application database 124, for example, as described above, if the installation time was less than a threshold time from the time at which the deployment features were received from the messaging module 304. The installation execution module 420 also forwards the initiating of the installation to a status update module 428. The status update module 428 updates the status database 132 with each step of the installation process received from the installation execution module 420 and the in-store device(s) 424 as the installation is occurring and whether the installation is successful or unsuccessful. That is, at the successful installation or unsuccessful installation, the in-store device(s) 424 transmit a status of the installation. In various implementations, the in-store device(s) 424 send a present status at default intervals (e.g., installation begun, installation pending, installation successful, installation unsuccessful, etc.).

For instance, if an installation is unsuccessful, the in-store device(s) 424 will update the status database 132 that the installation of the corresponding application on the reporting in-store device(s) 424 was not successfully installed. Optionally, an alert generation module 432 may receive certain status updates from the status update module 428, such as cancellation, unsuccessful installation, etc. The alert generation module 432 may generate and transmit an alert to the approval device 104 (or another device), indicating that an approved installation was not successful. Then, an operator can intervene and adjust or cancel future deployment and/or perform manual intervention to install the application on the appropriate store device(s). In various implementations, the installation execution module 420 may attempt to install a particular application a threshold number of times before deeming the installation unsuccessful.

While not shown, in various implementations, the deployment device 102 may directly broadcast cancellation messages to the queue database 412 (or another module of the implementation module 316) when an operator cancels an installation that was previously scheduled. The corresponding set of deployment features is modified to indicate the installation is canceled. Once the installation time occurs, the installation execution module 420 determines the set of deployment features includes a cancel request and exits the installation process.

Figure 5A:
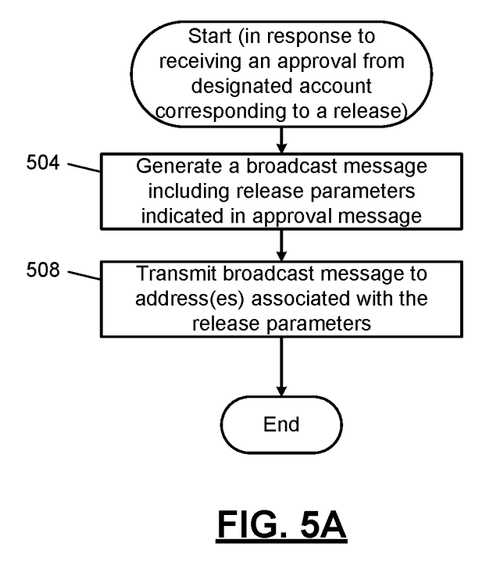
FIGS. 5A and 5B are flowcharts of example methods of message deployment in accordance with some embodiments.
Figure 5B:
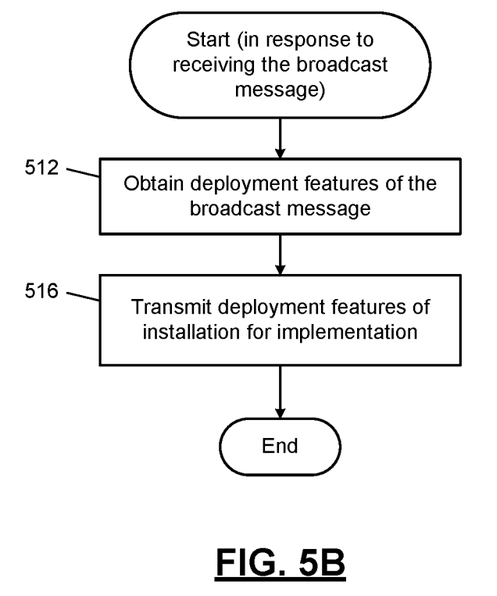

Referring to FIGS. 5A and 5B, flowcharts of example methods of message deployment is shown. For FIG. 5A, control begins in response to receiving an approval from a designated account or individual corresponding to a release or deployment. That is, control begins once approval of the release or deployment is received. As described above, the approver may be one of a set of individuals who review the details of the deployment and approve the deployment. The actual features of the deployment may be generated and received from a different individual, to ensure at least two people are reviewing the deployment. The deployment features indicate which stores are receiving an installation, an application to be installed, installation times for each store receiving installation, etc. In this way, the individual generating the deployment features can set which times the installation will occur as to not overwhelm any store systems based on, for example, normal operating times, other installations, etc. In various implementations, a default installation time may be associated with each store, for example, during the middle of the night, local time, when the store is regularly not operating the particular in-store devices receiving the installation.

Control proceeds to 504 to generate a broadcast message including release or deployment parameters indicated in the approval message, such as a portion of or all of the deployment features described in FIGS. 3 and 4. Control continues to 508 to transmit a notification to the address(es) associated with or indicated in the release parameters. Then, control ends. For example, control of FIG. 5A may be implemented by the deployment device 102 of FIG. 1.

In FIG. 5B, control begins in response to receiving the broadcast message at each store device 120, by, for example, the message module. Control continues to 512 to obtain deployment features associated with the deployment indicated in the broadcast message from a database, such as the deployment features database 128 described above. Control proceeds to 516 to transmit the deployment features of the installation (indicated in the broadcast message) for implementation, such as to the implementation module 316, described above.

Figure 6:
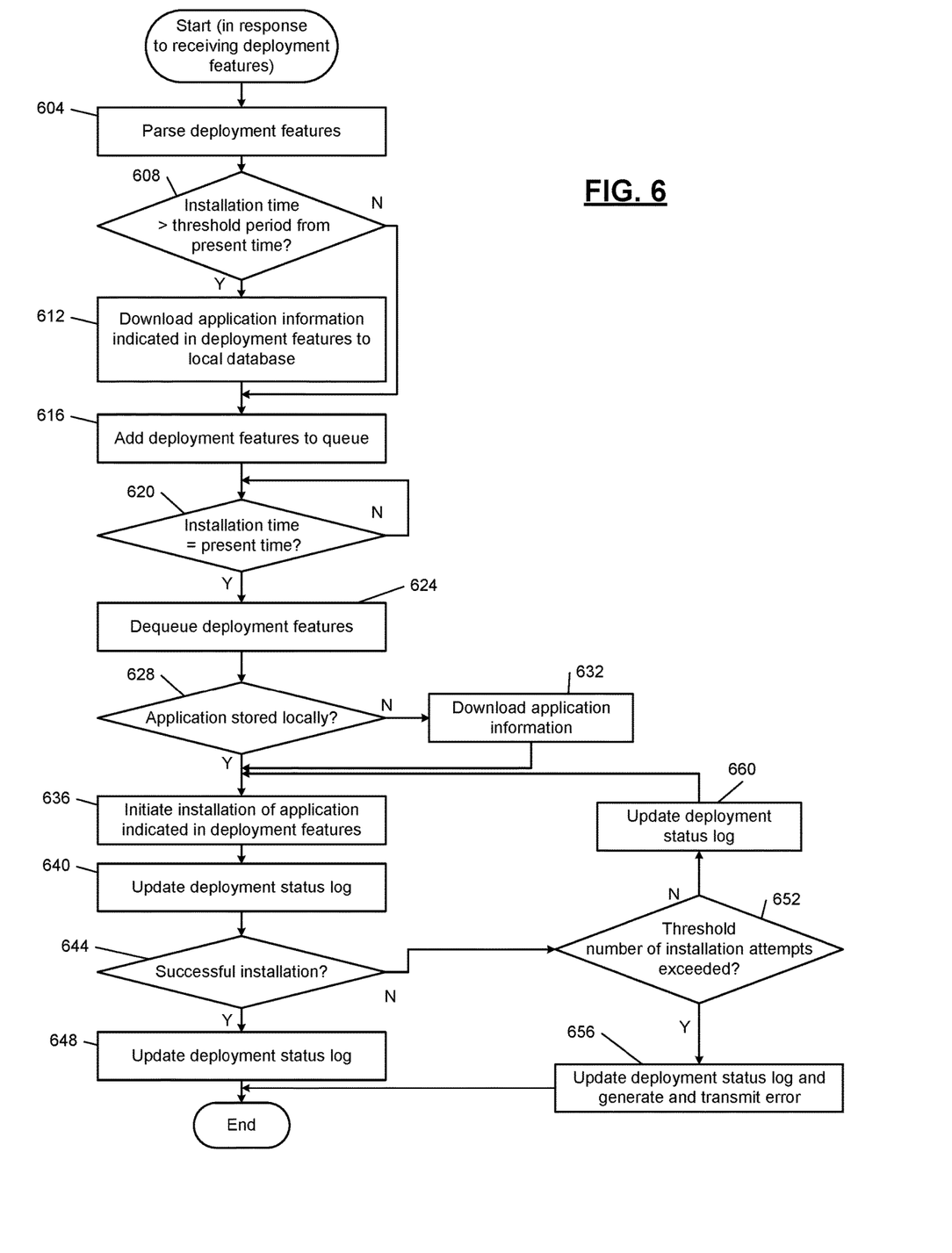
FIG. 6 is a flowchart of example methods of application installation at a local location in accordance with some embodiments.

Referring now to FIG. 6, a flowchart of example methods of application installation at a local location is shown. Control begins in response to receiving deployment features. Control is being operated at a particular store that is included in the deployment features. Control proceeds to 604 to parse the deployment features. As mentioned previously, the deployment features may include application identifiers indicating the application for installation, the installation time for each of the stores, device identifiers that having the application installed, etc. Control continues to 608 to determine if the installation time is greater than a threshold period from the present time. For example, as noted previously, if the installation time is greater than the threshold period away from the present time, such as 30 minutes, control proceeds to 612.

Then, at 612, control downloads the application information indicated in the deployment features to a local database. That is, control downloads the application for local available to install at the installation time. This delay in installation allows for the application to be installed at a time that is not interrupting the local network of the store and also avoids any future connectivity outages the local store may encounter, ensuring the downloaded, now local, application can be installed at the set installation time. Control continues to 616 to add deployment features to a queue. Additionally, if the installation time is not greater than the threshold period, control continues to 616 to add the deployment features to the queue. Then, control proceeds to 620 to determine if the installation time of a queued set of deployment features is equal to a present time. If yes, control proceeds to 624. Otherwise, control waits for the present time to correspond to an installation time. As noted previously, if the installation time is excluded from the deployment features, control may set the installation time to the present time upon adding the deployment features to the queue.

At 624, control dequeues the corresponding deployment features. Then, at 628, control determines if the application has been stored locally. That is, control searches for the application indicated in the deployment features in a local database, which would be true for applications that had an installation time greater than the threshold period from the time when the deployment features were received. If the application is not stored locally, control continues to 632 to download the application information. If the application is stored locally or one the application information is downloaded in 632, control continues to 636 to initiate installation of the application indicated in the deployment features.

Control continues to 640 to update the deployment status log that installation has begun. Then, control proceeds to 644 to determine if the installation was successful. If yes, control updates the deployment status log that installation was successful at 648 and control ends. Otherwise, if at 644 installation was not successful, control proceeds to 652 to determine if a threshold number of installation attempts is exceeded. For example, if the installation was attempted and unsuccessful over three times, control then continues to 656 to update the deployment status log that the attempt threshold has been exceeded, and generates and transmits an error to a device operated by the deployment system (e.g., the approval device). Then, control ends. Otherwise, if the attempt threshold is not exceeded at 652, control continues to 660 to update the deployment status log of the unsuccessful attempt and returns to 636.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a computing device configured to:
 receive a broadcast message from a deployment device in response to the deployment device receiving an approval notification, the broadcast message including a deployment parameter identifier;
 obtain a plurality of deployment parameters via a distributed communications system, wherein the plurality of deployment parameters are obtained from a first database based on the deployment parameter identifier;
 parse the approval notification to identify an application identifier;
 identify an installation time included in the plurality of deployment parameters;
 download application data associated with the application identifier included in the plurality of deployment parameters to a local database prior to the installation time, wherein the application data is obtained from a second database;
 initiate an installation of the application data from the local database at the installation time;
 determine whether at least one of the plurality of deployment parameters includes a cancel notice;

terminate the installation of the application data from the local database if at least one of the plurality of deployment parameters includes the cancel notice;

update a deployment status log based on the initiation of the installation; transmit a status update to the deployment device in response to the installation being initiated; and update the deployment status log based on the status update.

2. The system of claim 1, wherein the computing device is configured to:

determine a present time;

download the application data to the local database in response to a difference between the installation time and the present time being greater than a threshold period; and store the downloaded application data and the plurality of deployment parameters in a queue.

3. The system of claim 2, wherein the computing device is configured to:

in response to the installation time of at least one set of deployment parameters being the present time, dequeue the downloaded application data; and initiate installation of the downloaded application data from the local database.

4. The system of claim 2, wherein the computing device is configured to, when the difference is less than the threshold period, delay downloading the application data associated with the application identifier included in the plurality of deployment parameters to the local database until the installation time.

5. The system of claim 1, wherein the approval notification indicates (i) a plurality of computing devices to transmit the broadcast message, (ii) the application identifier, and (iii) a corresponding installation time for each of the plurality of computing devices.

6. The system of claim 1, wherein initiating installation of the application data from the local database includes installing the application data on at least one local device.

7. The system of claim 6, wherein the at least one local device is indicated in the plurality of deployment parameters.

8. The system of claim 6, wherein the computing device is configured to, in response to receiving a second notification indicating a successful installation from the at least one local device, transmit the status update to the deployment device indicating the successful installation on the at least one local device.

9. The system of claim 6, wherein the computing device is configured to, in response to a threshold number of unsuccessful installation attempts on the at least one local device being received, generate and transmit an alert to the deployment device indicating unsuccessful installation.

10. A method comprising:

receiving a broadcast message from a deployment device in response to the deployment device receiving an approval notification, the broadcast message including a deployment parameter identifier;

obtaining a plurality of deployment parameters via a distributed communications system, wherein the plurality of deployment parameters are obtained from a first database based on the deployment parameter identifier;

parsing the approval notification to identify an application identifier;

identifying an installation time included in the plurality of deployment parameters;

downloading application data associated with the application identifier included in the plurality of deployment parameters to a local database prior to the installation time, wherein the application data is obtained from a second database;

initiating an installation of the application data from the local database at the installation time;

determining whether at least one of the plurality of deployment parameters includes a cancel notice;

terminating the installation of the application data from the local database if at least one of the plurality of deployment parameters includes the cancel notice;

updating a deployment status log based on the initiation of the installation; transmitting a status update to the deployment device in response to the installation being initiated; and updating the deployment status log based on the status update.

11. The method of claim 10, further comprising:

determining a present time; downloading the application data to the local database in response to a difference between the installation time and the present time being greater than a threshold period; and storing the downloaded application data and the plurality of deployment parameters in a queue.

12. The method of claim 11, further comprising:

in response to the installation time of at least one set of deployment parameters being the present time, dequeuing the downloaded application data; and initiating installation of the downloaded application data from the local database.

13. The method of claim 11, further comprising, when the difference is less than the threshold period, delaying downloading the application data associated with the application identifier included in the plurality of deployment parameters to the local database until the installation time.

14. The method of claim 10, wherein the approval notification indicates (i) a plurality of computing devices to transmit the broadcast message, (ii) the application identifier, and (iii) a corresponding installation time for each of the plurality of computing devices.

15. The method of claim 10, wherein initiating installation of the application data from the local database includes installing the application data on at least one local device.

16. The method of claim 15, wherein the at least one local device is indicated in the plurality of deployment parameters.

17. The method of claim 15, further comprising, in response to receiving a second notification indicating a successful installation from the at least one local device, transmitting the status update to the deployment device indicating the successful installation on the at least one local device.

18. The method of claim 15, further comprising, in response to a threshold number of unsuccessful installation attempts on the at least one local device being received, generating and transmitting an alert to the deployment device indicating unsuccessful installation.

19. A non-transitory computer readable medium having instructions stored thereon, wherein the instructions, when executed by at least one processor, cause a device to perform operations comprising:

receiving a broadcast message from a deployment device in response to the deployment device receiving an approval notification, the broadcast message including a deployment parameter identifier;

obtaining a plurality of deployment parameters via a distributed communications system, wherein the plurality of deployment parameters are obtained from a first database based on the deployment parameter identifier;

parsing the approval notification to identify an application identifier;

identifying an installation time included in the plurality of deployment parameters;

downloading application data associated with the application identifier included in the plurality of deployment parameters to a local database prior to the installation time, wherein the application data is obtained from a second database;

initiating an installation of the application data from the local database at the installation time;

determining whether at least one of the plurality of deployment parameters includes a cancel notice;

terminating the installation of the application data from the local database if at least one of the plurality of deployment parameters includes the cancel notice;

updating a deployment status log based on the initiation of the installation;

transmitting a status update to the deployment device in response to the installation being initiated; and updating the deployment status log based on the status update.

20. The non-transitory computer readable medium of claim 19, wherein the instructions include:

determining a present time; downloading the application data to the local database in response to a difference between the installation time and the present time being greater than a threshold period; and storing the downloaded application data and the plurality of deployment parameters in a queue.

* * * * *